US012585495B2

(12) United States Patent
Anil et al.

(10) Patent No.: US 12,585,495 B2
(45) Date of Patent: Mar. 24, 2026

(54) DISTRIBUTED COMPUTING PIPELINE PROCESSING

(71) Applicant: Google LLC, Mountain View, CA (US)

(72) Inventors: Rohan Anil, San Francisco, CA (US); Battulga Bayarsaikhan, Palo Alto, CA (US); Ryan P. Doherty, San Jose, CA (US); Emanuel Taropa, San Jose, CA (US)

(73) Assignee: Google LLC, Mountain View, CA (US)

( * ) Notice: Subject to any disclaimer, the term of this patent is extended or adjusted under 35 U.S.C. 154(b) by 748 days.

(21) Appl. No.: 17/909,680

(22) PCT Filed: Mar. 6, 2020

(86) PCT No.: PCT/US2020/021558
§ 371 (c)(1),
(2) Date: Sep. 6, 2022

(87) PCT Pub. No.: WO2021/177976
PCT Pub. Date: Sep. 10, 2021

(65) Prior Publication Data
US 2023/0105476 A1     Apr. 6, 2023

(51) Int. Cl.
*G06F 9/46*          (2006.01)
*G06F 9/48*          (2006.01)
(Continued)

(52) U.S. Cl.
CPC ........... *G06F 9/4881* (2013.01); *G06N 3/045* (2023.01); *G06N 3/098* (2023.01)

(58) Field of Classification Search
CPC .... G06F 9/4881; G06F 9/5066; G06F 9/5044; G06F 9/505; G06F 2209/483;
(Continued)

(56) References Cited

U.S. PATENT DOCUMENTS

| | | | | |
|---|---|---|---|---|
| 11,163,605 B1* | 11/2021 | Santan | ................ | G06F 15/7807 |
| 2003/0191795 A1* | 10/2003 | Bernardin | ............... | G06F 9/505 |
| | | | | 709/201 |

(Continued)

OTHER PUBLICATIONS

Bajrovic et al., "Automatic Performance Tuning of Pipeline Patterns for Heterogeneous Parallel Architectures" Proceedings of the International Conference on Parallel and Distributed Processing Techniques and Applications (PDPTA). The Steering Committee of The World Congress in Computer Science, Computer Engineering and Applied Computing (WorldComp), Jul. 2014, 7 pages.

(Continued)

*Primary Examiner* — April Y Blair
*Assistant Examiner* — Zhi Chen
(74) *Attorney, Agent, or Firm* — Fish & Richardson P.C.

(57) ABSTRACT

Methods, systems, and apparatus, including computer programs encoded on computer storage media, for processing computational graphs on distributed computing devices. One of the methods includes receiving a request to execute a processing pipeline (i) first operations that transform raw inputs into pre-processed inputs and (ii) second operations that operate on the pre-processed inputs; and in response: assigning the first operations to two or more of a plurality of computing devices, assigning the second operations to one or more hardware accelerators of a plurality of hardware accelerators, wherein each hardware accelerator is interconnected with the plurality of computing devices, and configured to (i) receive inputs from respective queues of the two or more computing devices assigned the first operations and (ii) perform the second operations on the received pre-processed inputs, and executing, in parallel, the processing pipeline on the two or more computing devices and the one or more hardware accelerators.

19 Claims, 5 Drawing Sheets

(51) Int. Cl.
    *G06N 3/045*         (2023.01)
    *G06N 3/098*         (2023.01)

(58) Field of Classification Search
    CPC .. G06F 2209/509; G06N 3/098; G06N 3/045;
                        G06N 3/08; G06N 3/04
    See application file for complete search history.

(56) References Cited

U.S. PATENT DOCUMENTS

| 2009/0187915 | A1* | 7/2009 | Chew | G06F 9/5044 |
| | | | | 718/104 |
| 2012/0158672 | A1* | 6/2012 | Oltean | G06F 16/13 |
| | | | | 707/E17.005 |
| 2014/0026147 | A1* | 1/2014 | Cherkasova | G06F 9/5083 |
| | | | | 718/105 |
| 2015/0227394 | A1* | 8/2015 | Chin | G06F 9/5016 |
| | | | | 718/104 |
| 2016/0291977 | A1* | 10/2016 | Bai | G06F 3/0604 |
| 2017/0070692 | A1* | 3/2017 | Lin | H04N 25/67 |
| 2017/0255878 | A1* | 9/2017 | Fu | G06N 20/00 |
| 2017/0270245 | A1* | 9/2017 | van Rooyen | G16B 50/40 |
| 2018/0182127 | A1* | 6/2018 | Kol | H04N 19/182 |
| 2019/0114533 | A1 | 4/2019 | Ng et al. | |
| 2019/0251713 | A1* | 8/2019 | Chen | A61B 6/482 |
| 2019/0280991 | A1* | 9/2019 | Singh | H04L 49/90 |
| 2020/0311569 | A1* | 10/2020 | Ghosh | G06N 20/00 |
| 2021/0020045 | A1* | 1/2021 | Huang | G05D 1/692 |

OTHER PUBLICATIONS

Extended European Search Report in European Appln. No. 23206974. 0, mailed on Dec. 18, 2023, 14 pages.

Cheng et al., "DLBooster: Boosting End-to-End Deep Learning Workflows with Offloading Data Preprocessing Pipelines," Proceedings of the 48th International Conference on Parallel Processing, Aug. 5, 2019, 11 pages.

International Preliminary Report on Patentability in International Appln. No. PCT/US2020/021558, dated Sep. 15, 2022, 10 pages.

International Search Report and Written Opinion in International Appln. No. PCT/US2020/021558, mailed on Dec. 7, 2020, 12 pages.

Kothapalli et al., "CPU and/or GPU: Revisiting the GPU Vs. CPU Myth," arXiv, Mar. 9, 2013, 20 pages.

Mittal et al., "A Survey of CPU-GPU Heterogeneous Computing Techniques," ACM Computing Surveys, Jul. 21, 2015, 47(4):1-35.

* cited by examiner

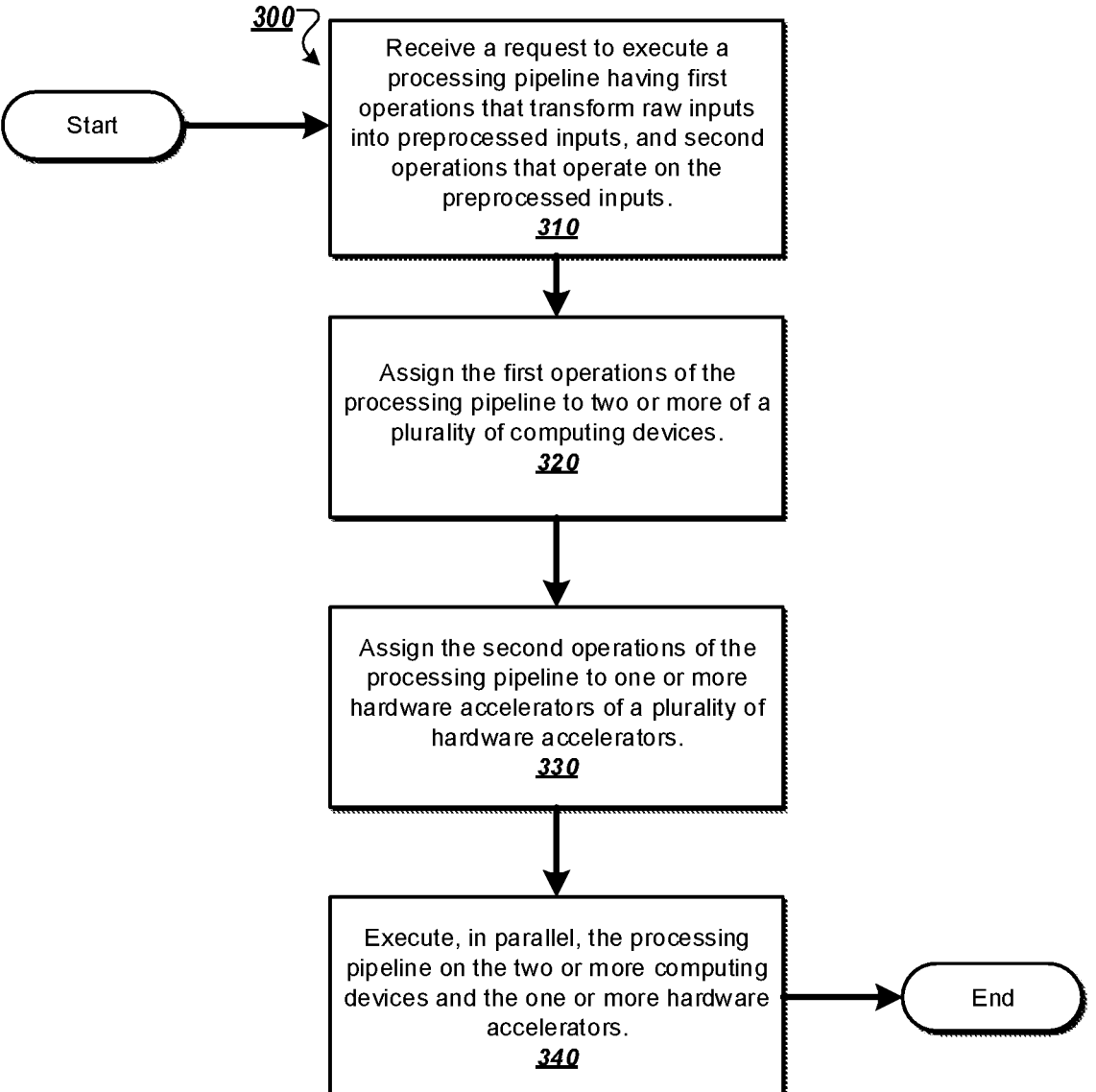

Start

*300*

Receive a request to execute a processing pipeline having first operations that transform raw inputs into preprocessed inputs, and second operations that operate on the preprocessed inputs.
*310*

Assign the first operations of the processing pipeline to two or more of a plurality of computing devices.
*320*

Assign the second operations of the processing pipeline to one or more hardware accelerators of a plurality of hardware accelerators.
*330*

Execute, in parallel, the processing pipeline on the two or more computing devices and the one or more hardware accelerators.
*340*

End

FIG. 3

DISTRIBUTED COMPUTING PIPELINE PROCESSING

CROSS-REFERENCE TO RELATED APPLICATION

This application is a National Stage Application under 35 U.S.C. § 371 of International Application No. PCT/US2020/021558, filed on Mar. 6, 2020. The disclosure of the prior application is considered part of and is incorporated by reference in the disclosure of this application.

BACKGROUND

This specification relates to training machine learning models, including neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of network parameters.

SUMMARY

This specification describes technologies for improving the computational throughput of specialized hardware accelerators by using a plurality of available computing devices to provide preprocessed data for hardware accelerator consumption.

These technologies generally involve receiving a processing pipeline of preprocessing operations and operation data representing operations to be executed on a plurality of hardware accelerators. The operations represented by the operation data can be, for example, operations for training or executing a machine learning model. The operations specified by the operation data can include operations that the hardware accelerators are optimized to perform, e.g., matrix multiplication. The processing pipeline can specify the operation data as a computational graph having nodes representing operations and edges representing data dependencies between the operations.

Computing devices assigned the preprocessing operations can be configured to continuously preprocess input for eventual processing by hardware accelerators assigned the operation data for the processing pipeline. The hardware accelerators can be configured to fetch enqueued input from multiple computing devices assigned the preprocessing operations.

Hardware accelerators are computing devices having specialized hardware configured to perform specialized computations, e.g., graphics processing units ("GPUs"), field-programmable gate arrays ("FGPAs"), and application-specific integrated circuits ("ASICs"), including tensor processing units ("TPUs"). Hardware accelerators can also include one or more central processing units ("CPUs") for performing functions not related to the specialized computations, e.g., network computation, data decompression, or compilation, e.g., of operation data received as a computational graph into a set of operations executable by the hardware accelerator.

Computing devices in general include general-purpose devices that can be configured to receive data and perform preprocessing operations, e.g., formatting data into a suitable format to be received by the hardware accelerators. Given the specialized nature and generally higher cost of hardware accelerators as compared with more widely-available general-purpose computing devices, a system implementing techniques described in this specification generally includes more general-purpose devices than accelerators.

In addition, because the specialized hardware accelerators are generally capable of processing data at speeds that are orders of magnitude faster than speeds at which general-purpose devices can transform raw input data into preprocessed inputs for the hardware accelerators, a computational bottleneck can occur in which a hardware accelerator is intermittently idle as it waits for more input to become available, i.e., the hardware accelerator experiences "starvation" of available input for processing. This computational bottleneck is only worsened as incremental improvements to hardware accelerators continue to out-pace computational improvements to general-purpose devices. Similar bottlenecks occur based on memory-read speed and network bandwidth.

By employing the techniques described in this specification, each hardware accelerator assigned the operation data can have the number of computing devices the hardware accelerator fetches the inputs from scaled to limit or prevent starvation, i.e., improving computational throughput of preprocessed inputs to the hardware accelerator so the time the hardware accelerator is idle and waiting for input is limited or eliminated altogether. The hardware accelerator can implement load-balancing techniques to fetch training data from the computing devices as individual inputs, or batches of inputs from a respective computing device.

The subject matter described in this specification can be implemented in particular implementations so as to realize one or more of the following advantages. Specialized hardware accelerators can be utilized more efficiently by more optimal throughput of data previously hampered by the rate at which data can be preprocessed and provided to the accelerators by conventional approaches. A hardware accelerator can be configured to fetch data from multiple computing devices assigned to preprocess input data for the hardware accelerator.

Processing pipelines representing operations for training a machine learning model, e.g., a neural network, can be trained more efficiently in terms of reduced computational and operating costs, and reduced time-to-completion for each task represented by the processing pipeline.

In addition to reducing a computational bottleneck, the distribution of data generation across general-purpose computing devices can alleviate the memory bottleneck that often limits the processing speed of a computing device processing input data to the amount of memory that can be cached at any one time on the computing device, because the collective memory of multiple computing devices assigned to a hardware accelerator can be leveraged.

Similarly, the techniques described in this specification can reduce network congestion by extracting and reducing raw input data into relevant features that collectively form a training example, which can be sent directly to an accelerator for processing without requiring preprocessing by the accelerator itself.

Because hardware accelerators are generally more expensive to build and maintain than inexpensive and widely available general-purpose devices, techniques described in this specification can cheaply and efficiently scale a number of computing devices providing data for hardware accelerator consumption. The system can flexibly re-assign hardware accelerators assigned to temporarily unavailable or defective computing devices to other available computing devices to mitigate interruption to the hardware accelerator processing.

As hardware accelerators are replaced with improved hardware, additional computing devices can be programmatically assigned to keep up with the increased computational demand of the accelerator. A distributed computing system implementing techniques described in this specification can be configured to identify a respective ratio of computing device to hardware accelerator assignments for each hardware accelerator, which can be flexibly implemented across a group of hardware accelerators of different architectures and computational characteristics.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for training a neural network represented as a computational graph.

Like reference numbers and designations in the various drawings indicate like elements.

DETAILED DESCRIPTION

Figure 1:
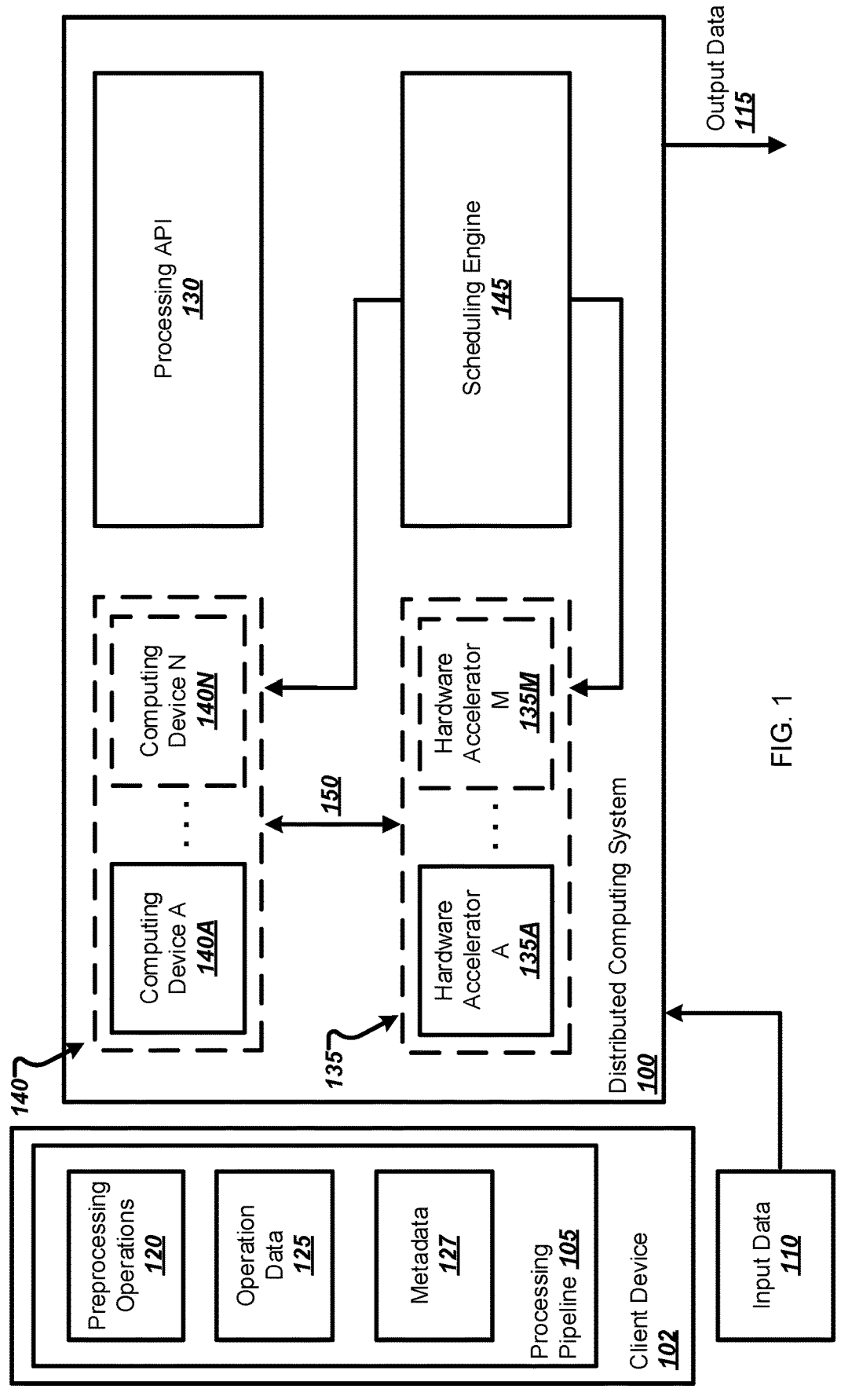
FIG. 1 illustrates an example distributing computing system for executing operations of a processing pipeline.

FIG. 1 illustrates an example distributing computing system 100 for executing operations of a processing pipeline 105. The processing pipeline 105 can be provided by a client device 102. The distributed computing system 100 can receive data identifying the processing pipeline 105 and input data 110, and generate output data 115 corresponding to executing the operations represented by processing pipeline 105 on the input data 110.

The processing pipeline 105 includes preprocessing operations 120 and operation data 125. The processing pipeline 105 can be represented as a software object defined by functions of a processing Application Program Interface ("API") 130 implemented by the distributed computing system 100. The processing API 130 can define one or more functions that, when executed by an appropriately configured client device, e.g., the client device 102, causes the client device to create a software object corresponding to the processing pipeline 105, and specifically, the preprocessing operations 120 and the operation data 125.

The preprocessing operations are any operations that need to be performed on input data to prepare the data for processing by a machine learning model.

The preprocessing operations 120 can receive, as input, raw data, and generate, as output, preprocessed data that filters out extraneous or irrelevant information.

In addition to filtering out useless information, a computing device executing the preprocessing operations 120 can process raw data and perform data augmentation. For example, if the raw data represents a collection of images, a computing device can execute the preprocessing operations 120 to crop, rotate, or other manipulate each image in preparation for processing on a hardware accelerator.

As another example, if the processing pipeline 105 represents operations for training or executing a machine learning model, e.g., a neural network, then the preprocessing operations 120 can be operations for preparing raw input data to be received as properly-formatted input for the machine learning model being deployed on the hardware accelerators of the distributed computing system 100, described below. Examples of preprocessing operations can include binarizing, standardizing, or normalizing input data: restructuring input data into an acceptable data format, e.g., a tensor; and encoding features of the input data, e.g., one-hot encoding of categorical features.

The operation data 125 can be represented as a computational graph having a plurality of nodes and one or more edges. Each node of the computational graph represents a respective operation of the plurality of operations. For any two nodes u and v in the computational graph, an edge (u, v) is a directed edge and represents a data dependency from u to v. A data dependency from u to v means the operation represented by node u generates an output that is input to the operation represented by node v. Therefore, the node-u operation must be performed before performing the node-v operation.

A computational graph can represent operations for processing an input through a neural network, e.g., as part of training or at inference. A neural network can be configured to receive any kind of digital data input as a network input and to generate any kind of network output, i.e., any kind of score, classification, or regression output based on the network input, as part of performing a machine learning task. The neural network processes the input to generate a network output by performing a plurality of operations. Each operation can receive zero or more inputs, and can generate an output. The inputs and output can be, for example, a scalar value, a categorical value, a vector, a matrix, or a tensor. A tensor is a multidimensional array of numeric or other values, e.g., strings, having a specific order that corresponds to the dimensionality of the array. For example, a scalar value is a 0th-order tensor, a vector of numeric values is a 1st-order tensor, and a matrix is a 2nd-order tensor.

When trained, a neural network is configured to perform a machine learning task by processing an input and generating an output for the input corresponding to the task the neural network was trained to perform. Examples follow.

In some cases, the neural network is a convolutional neural network that is configured to receive an input image and to process the input image to generate a network output for the input image, i.e., to perform some kind of image processing task. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the task neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the task neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence of text in a spoken language, the output generated by the neural network may be an audio soundtrack of the input text spoken aloud.

As another example, if the input to the neural network is a sequence representing a spoken utterance, the output generated by the task neural network may be a score for each of a set of pieces of text, each score representing an estimated likelihood that the piece of text is the correct transcript for the utterance.

As another example, if the input to the neural network is one or more images of an environment that includes one or more objects and a robot, the output generated by the neural network may define one or more commands that when executed by the robot, causes the robot to manipulate the one or more objects according to some objective, e.g., grasp and move the objects, sort the objects, or avoid the objects.

As another example, if the input to the neural network is an electronic record, e.g., an electronic health record, the output generated by the neural network may be data specifying characteristics of the electronic record, e.g., a prediction about the health of the patient corresponding to the electronic health record.

As another example, if the input to the neural network is an observation of a reinforcement learning agent's state in an environment, the output generated by the neural network may define an action for the agent to take in response to the observation.

The processing API 130 can define functions for generating a computational graph according to provided operations, input parameters, and output parameters. These operations and parameters can be provided, for example, as part of a software program executed by the client device 102 and implementing the processing API 130.

The processing API 130 can define functions, that when executed by the client device 102, cause the client device 102 to populate a software object with metadata 127 corresponding to the processing pipeline 105 and its execution on the distributed computing system 100. For example, the metadata 127 can specify information that can be used by a scheduling engine 145 in scheduling the processing pipeline 105 for execution in the distributed computing system 100, e.g., the identity of a user associated with the processing pipeline 105, a priority level for execution of the processing pipeline 105, and preferred types of computing devices to execute the processing pipeline 105 on. As described below, the metadata 127 can also specify conditions for the number of computing devices and hardware accelerators to be assigned the processing pipeline 105.

In addition, the processing API 130 can be implemented as a "wrapper" around a preexisting library of functions for generating a computational graph, e.g., as an API wrapper to the TensorFlow library. An API wrapper refers to an API having functions defined to call functions defined in other APIs, but with modification, removal, or addition of (i) function logic, (ii) arguments, or both.

The distributed computing system 100 includes one or more hardware accelerators A-M 135A-M (collectively, "hardware accelerators 135") and one or more computing devices A-N 140A-N (collectively, "computing devices 140").

In this specification, a hardware accelerator is a computing device having one or more specialized processing units of special-purpose logic circuitry and that is configured to perform a specialized processing task, e.g., matrix multiplication. Hardware accelerators can include FGPAs, ASICs, GPUs, and TPUs. Hardware accelerators can also have one or more processing units that are configured for general-purpose computation, i.e., are not configured for performing a specialized operation. A hardware accelerator can be configured to preform specialized processing necessary to train or execute a neural network.

For example, a hardware accelerator can include one or more "host" CPUs that are physically implemented on the same hardware as the hardware accelerator. The host CPUs can be designed according to any conventional architecture, e.g., a Von Neumann architecture or a Harvard or modified Harvard architecture. The host CPUs of the hardware accelerator can be configured to perform operations that are not the specialized operations the hardware accelerator is configured to perform. For example, the host CPUs can be configured to execute the operations to communicate and request preprocessed inputs for the hardware accelerator and from the computing devices.

The host CPUs can also be configured to compile operation data into a set of machine-readable instructions that the hardware accelerator can execute. Unlike hardware accelerators, "computing device" is used in this specification to refer to a general-purpose computing device this is not configured to perform a specialized operation. Each computing device of the computing devices 140 can include one or more CPUs.

The computing devices 140 and the hardware accelerators 135 are interconnected as a network 150. The computing devices 140 and the hardware accelerators 135 can be configured to communicate data to-and-from one or more other computing devices or hardware accelerators, i.e., through one or more communication link in the network 150. For example, each device and accelerator can be coupled physically, e.g., physically connected by cables, or can be coupled in other ways, e.g., by wireless connection.

The distributed computing system includes a scheduling engine 145. The scheduling engine 145 can be configured to receive the processing pipeline 105 and assign operations to the computing devices 140 and the hardware accelerators 135. The scheduling engine 145 can be any suitable scheduler.

Figure 2A:
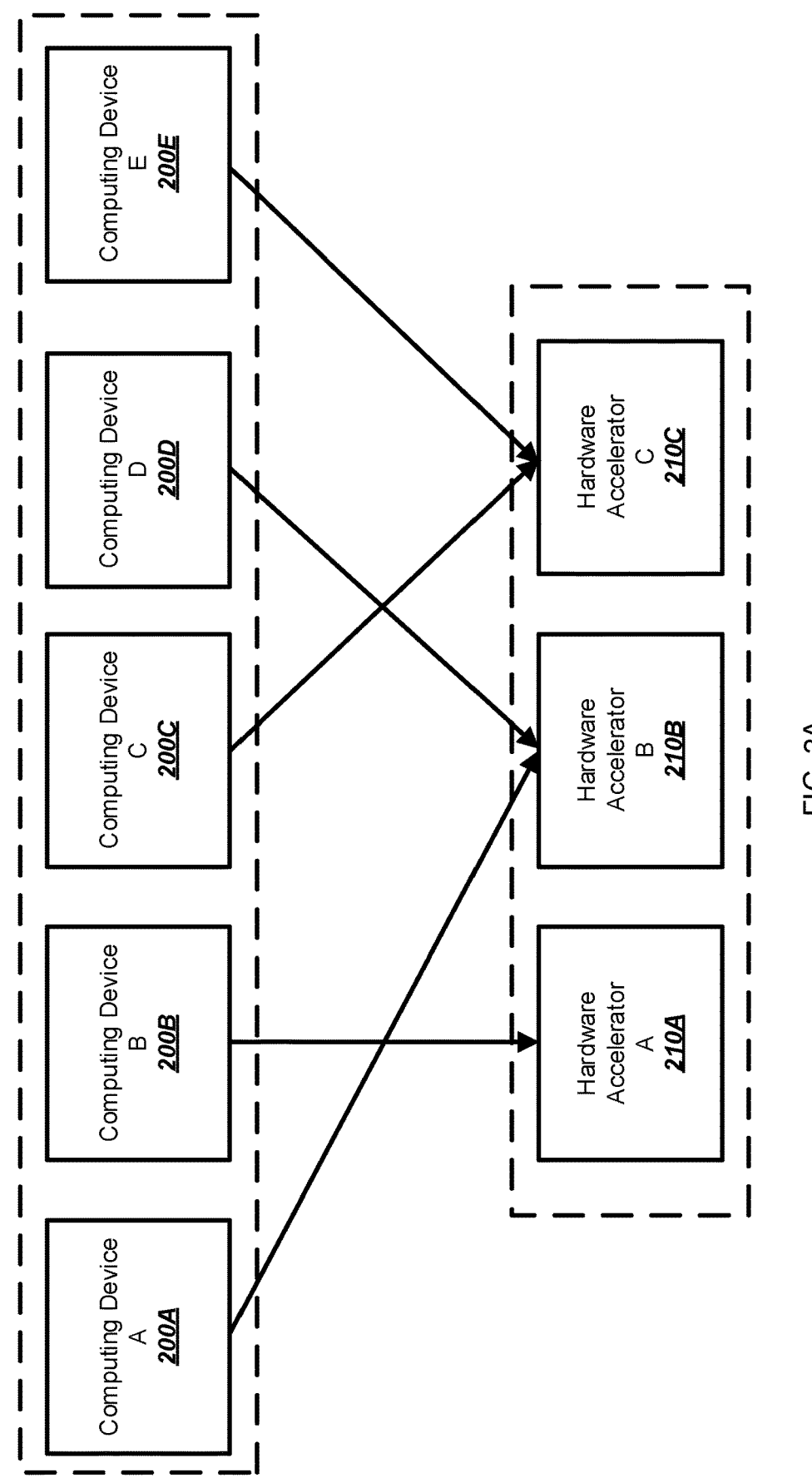
FIG. 2A illustrates computing devices interconnected to hardware accelerators.

FIG. 2A illustrates computing devices A-E 200A-E (collectively, "computing devices 200") interconnected to hardware accelerators A-C 210 (collectively, "hardware accelerators 210"). Specifically, each hardware accelerator can be interconnected to the computing devices 200. As an example, consider a processing pipeline representing operations for training a neural network: (i) preprocessing operations for preparing training examples: (ii) operation data representing operations for training the neural network; and (iii) additional metadata.

A distributed computing system that includes the computing devices 200 and the hardware accelerators 210 can assign, through a scheduler engine, (i) each computing device the preprocessing operations and (ii) each hardware accelerator with the computational graph.

Each of the computing devices 200 can generate preprocessed input as training examples. Specifically, each of the computing devices 200 can process input data to generate a plurality of training examples such that a hardware accelerator assigned the operation data can receive the training examples, as input, and process the training examples according to the operation data.

Each of the computing devices 200 can execute the preprocessing operations to generate training examples as separate stateless services. Specifically, each of the computing devices 200 can generate training examples independent of one another, e.g., as randomized training examples, even if the computing devices 200 are preprocessing the same dataset. As a result, the hardware accelerators 210 are free to fetch training examples from any computing device with negligible risk of two hardware accelerators training on substantially similar batches of training examples.

Each of the computing devices 200, after generating a training example, can enqueue the training example in a respective queue maintained by the computing device. Elements of a queue maintained by a computing device can be individual training examples, e.g., in the example in which the computational graph is for training a neural network, or elements of the queue can be batches of training examples. At any point, a queue includes zero or more training examples awaiting processing by a hardware accelerator.

Training examples can be generated individually or collectively, e.g., as tensors. When a hardware accelerator fetches an input from a computing device, the computing device dequeues one or more elements from the respective queue for the computing device, and transmits the one or more dequeued elements to the hardware accelerator over the interconnecting network.

The queue for a computing device can be maintained in local memory or memory remote to the computing device but externally accessible by the computing device, e.g., through a network. Although this specification describes the collection of training examples preprocessed by a respective computing device as a queue, implementations of the described subject matter are not limited to the type of data structure commonly referred to as a queue. In other words, the computing devices 200 can be configured to store ("enqueue") respective training examples according to any conventional data structure, e.g., as a stack, and can be configured to provide training examples ("dequeue") by any conventional access protocol, e.g., First-In-First-Out, First-In-Last-Out, or Last-In-First-Out.

Continuing with the example, the scheduler engine can assign each of the hardware accelerators the operation data of the processing pipeline. The hardware accelerators 210 can fetch training examples from one or more computing devices. How many and which computing devices a particular hardware accelerator fetches data from can be set automatically by the scheduler engine, based on load-balancing and the individual capacity of the hardware accelerator.

In general, the scheduler engine can calculate a ratio for each hardware accelerator, representing the number of computing devices that, when assigned to the hardware accelerator, can provide preprocessing inputs to the hardware accelerator so as to mitigate or eliminate starvation of the hardware accelerator.

For example, consider hardware accelerator A 210A to be a first-generation tensor processing unit, and hardware accelerators B 210B and C 210C to be second-generation tensor processing units. Here, "generation" refers to incremental changes in performance for a same type of hardware accelerator, e.g., a TPU. A later generation hardware accelerator generally performs better than an earlier generation hardware accelerator, e.g., because of improvements in computational capacity.

Based on a respective type of each hardware accelerator, the scheduler engine can assign a corresponding number of computing devices to match the computational capacity of each hardware accelerator. Continuing with the example, the hardware accelerator A is assigned one computing device, computing device B 200B. However, hardware accelerator B and C, both having a higher computational capacity than the hardware accelerator A are assigned two computing devices each: computing device A 200A and computing device D 200D to hardware accelerator B, and computing device C 200C and computing device E 200E to hardware accelerator C.

The ratio for a hardware accelerator can be determined by first determining how many training examples the hardware accelerator can process in a given period of time, e.g., 1 second. For example, if a hardware accelerator can process a batch of 1024 examples in 110 milliseconds, then the approximate number of training examples that the hardware accelerator can process in a second (1000 milliseconds) is 1024*(1000/110), or approximately 9,309 training examples a second. From the computed rate, the scheduler engine can assign available computing devices to the hardware accelerator until at least approximately 9,309 training examples can be provided by the assigned devices and to the hardware accelerator each second while the accelerator is processing. The training example processing rate can be pre-computed for each type of hardware accelerator implemented, and the scheduler engine can automatically assign an appropriate ratio of computing devices to a particular hardware accelerator based on the pre-computed rate.

By scaling the number of assigned computing devices to each hardware accelerator based on its computational capacity, the distributed computing system can improve computational throughput of the hardware accelerator and mitigate or prevent under-utilization (or "starvation") because the hardware accelerator can process training examples faster than what can be provided.

Although each hardware accelerator is depicted in FIG. 2A has having been assigned one or more unique computing devices, i.e., no two hardware accelerator shares the same computing device, in some implementations two hardware accelerators can share the same computing device. Similar to how the distributed computing system can assign computing devices to each hardware accelerator based on the computational capacity of the hardware accelerator, the distributed computing system can also assign computing devices to each hardware accelerator based on the computational capacity of each computing device.

For example, if a computing device has a computational capacity meeting a predetermined computational threshold, then the distributing computing system can assign multiple hardware accelerators to the computing device. The distributed computing system can determine the computational threshold based on the computational capacity of each hardware accelerator.

In addition or alternatively, each hardware accelerator of the distributed computing system can be configured to fetch enqueued data elements from each available computing device. For example, a hardware accelerator can be configured to fetch enqueued data elements randomly from all available computing devices. Alternatively, the hardware accelerator can be configured to fetch enqueued data elements from each available computing device sequentially, e.g., based on identifiers for the computing devices, e.g., a network address. By fetching data uniformly from each computing device, the hardware accelerators can reduce network congestion caused multiple hardware accelerators attempt to fetch data from the same computing device.

By assigning computing devices as described above, the distributed computing system can shift the computational demand away from the one or more host CPUS of a hardware accelerator, to free the host CPUs to perform other tasks. The following description will be made to a single host CPU, but it is understood that a hardware accelerator can implement more than one CPU.

In general, the host CPU can be configured to perform preprocessing operations of a processing pipeline. Conventionally, relying on the host CPU of a hardware accelerator to preprocess input data for its corresponding hardware accelerator results in the above-described computational bottleneck, because even state-of-the-art hardware accelerators can include host CPUs that lack the computational capacity to match the hardware accelerator's throughput. Therefore, the distributed computing system can be configured to support a host CPU's task for preprocessing data for consumption by the corresponding hardware accelerator.

In doing so, the distributed computing system can also overcome memory bottlenecks by reducing the number of external memory reads needed by the host CPU for a hardware accelerator to perform the preprocessing operations on a set of data. For example, consider the preprocessing operations to be preprocessing operations for generating training examples for training a neural network. Whereas one host CPU for a hardware accelerator may require a certain number of read/writes from external memory to load input data into memory for preprocessing, multiple computing devices assigned to the same hardware accelerator can provide more training examples in the same amount of time.

Rather than preprocessing data for hardware accelerator, a host CPU for the hardware accelerator can be configured to perform other tasks to further take advantage of the distributed arrangement of the computing devices 140 and the hardware accelerators 135. In some implementations, the host CPU for a hardware accelerator can batch preprocessed input from multiple computing devices assigned to its corresponding hardware accelerator. In doing so, the hardware accelerator is free to fetch preprocessed input data from a plurality of different computing devices and alleviate network traffic to any one particular computing device.

The host CPU can also be configured to decompress preprocessed input data previously compressed by a computing device of the computing devices 140 using a compression algorithm, e.g., the LZ77 algorithm. Compressed data refers to data that has been transformed into a representation that consumes less memory to store over its uncompressed original counterpart. After generating a batch of preprocessed input data, the computing devices 140 can be configured to compress each batch of data before adding the data to a respective queue. When a hardware accelerator dequeues a batch of compressed data from a queue, the host CPU for the hardware accelerator can be configured to decompress the data first. By decompressing the preprocessed input data, network strain is further reduced because less data is transmitted overall across the network 150.

The distributed computing system can be configured to execute a processing pipeline that includes operation data that is too large to store in memory for any one hardware accelerator. In some implementations, the distributed computing system is configured to partition operation data represented as a computational graph into a plurality of subgraphs. Each subgraph is linked to another subgraph by an edge that represents a flow of output from one subgraph as input to another subgraph.

The distributed computing system can be configured to partition the computational graph in a variety of ways, including based on the relative computational capability of each hardware accelerator. For example, the distributed computing system can partition and assign subgraphs so that each hardware accelerator assigned a respective subgraph can store the respective subgraph in an internal memory, obviating the need for reads or writes from an external source of memory optionally coupled to the hardware accelerator.

Depending on the number of subgraphs and the number of hardware accelerators available, the distributed computing system can assign a computational graph across multiple groups of hardware accelerators, with each hardware accelerator in a group being assigned a unique subgraph of the computational graph.

In implementations in which the distributed computing system partitions the computational graph into a plurality of subgraphs and assigns each subgraph to a respective hardware accelerator, the distributed computing system is configured to identify an input subgraph of the computational graph. In this specification, an input subgraph of a computational graph is a subgraph that includes a node that represents the input operation of the computational graph, i.e., the operation that receives, as input, a data element preprocessed by a computing device according as a result of executing the preprocessing operations.

After identifying a hardware accelerator assigned the input subgraph for the computational graph, the distributed computing system can assign computing devices to the identified hardware accelerator, using the techniques described above with reference to FIG. 1 and FIG. 2A. Hardware accelerators not assigned the input subgraph do not need to be assigned computing devices, because those hardware accelerators can receive input as output from other hardware accelerators.

Figure 2B:
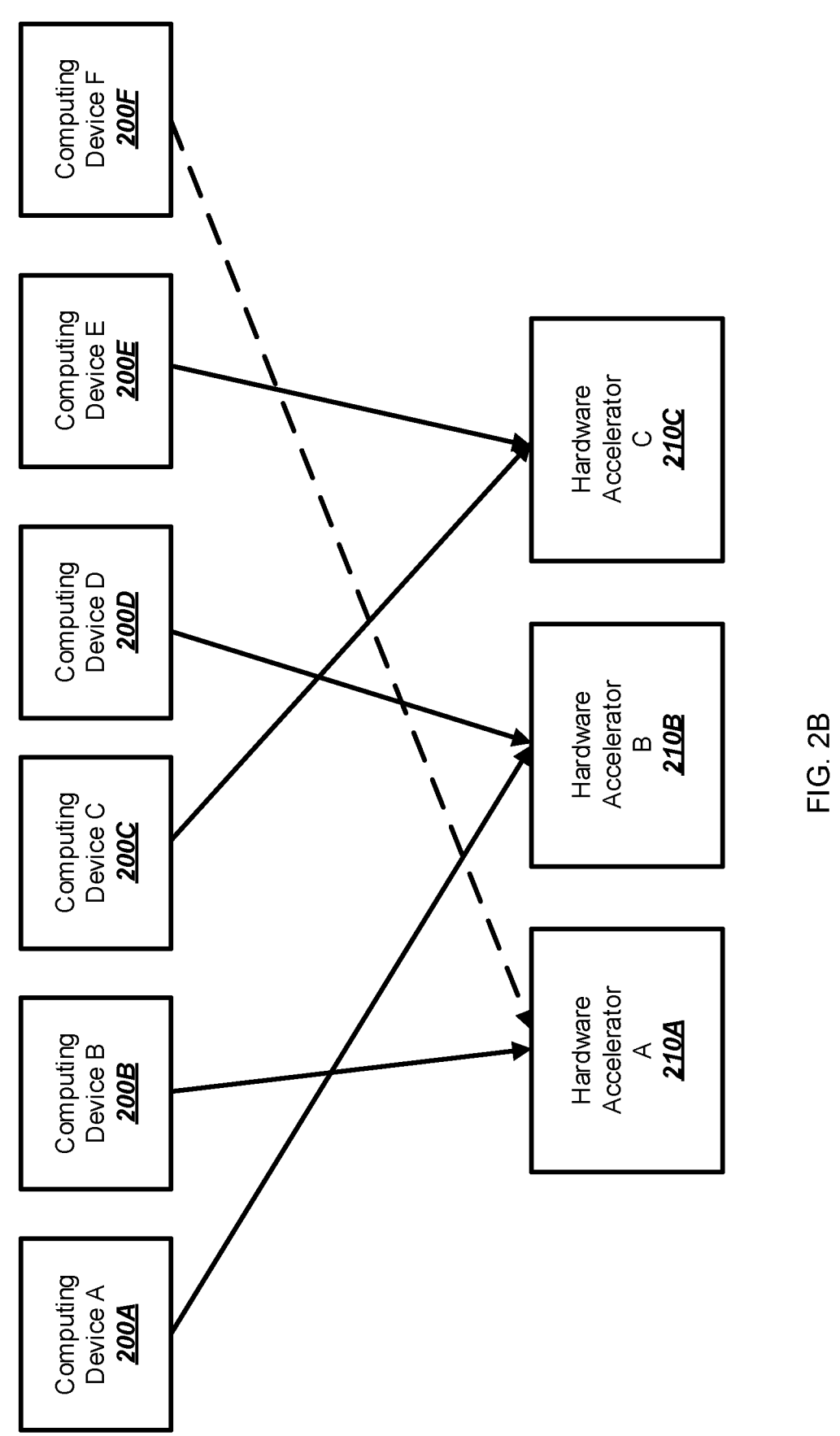
FIG. 2B illustrates the computing devices illustrated in FIG. 2A with an additional computing device interconnected to the hardware accelerators.

FIG. 2B illustrates the computing devices 200 illustrated in FIG. 2A with an additional computing device 200F interconnected to the hardware accelerators 210. The distributed computing system that includes the computing devices 200 and the hardware accelerators 210 can automatically assign new devices connected to the network interconnecting the hardware accelerators 210 and the computing devices 200. For example, and as shown in FIG. 2B, the computing device 200F is shown to be providing input training examples to the hardware accelerator A 210A, denoted by the dashed line.

In general, computing devices can be more easily added to the distributing computing system over hardware accelerators, because generally the computing devices are more easily accessible than the more expensive and specialized hardware accelerators. Computing devices can be added opportunistically, meaning that computing devices dedicated to performing other tasks can become available for preprocessing during periods in which the computing devices would be idle or otherwise not realizing maximum computational throughput.

A user sending a processing pipeline for processing on the distributed computing system is more likely to have one or more computing devices available and known to the user, and accordingly can provide identifiers to those available computing devices for use in generating training examples for hardware accelerator consumption. The input processing pipeline can include network addresses specifying computing devices that are available for pre-processing data, and the distributed computing system can automatically assign hardware accelerators to the specified computing devices.

Alternatively or in addition, the input processing pipeline can specify predetermined assignments. For example, the user can send an updated processing pipeline to the distributing computing system with updated metadata specifying that the computing device F 200F be assigned to the hardware accelerator A 210A, as shown in FIG. 2B.

Similarly, the distributed computing system can automatically handle re-assignment, if necessary, of computing devices to the hardware accelerators in situations in which one or more computing devices become unavailable for preprocessing. A computing device can go unavailable for a variety of reasons. For example, computing devices can become unavailable because of an intentional decision to divert the computational resources of the computing device towards performing another processing pipeline, or some set of operations unrelated to executing a processing pipeline. A computing device can also become unavailable because the computing device becomes disconnected from the network or is otherwise unable to generate and transmit training examples to an assigned hardware accelerator.

Regardless of the circumstances leading to a computing device's unavailability, the distributed computing system can detect when a computing device becomes unavailable, and re-adjust computing-device-to-hardware-accelerator assignment automatically, in response. The distributed computing system can be configured to perform this re-assignment according to a variety of different approaches that can, for example, favor overall utilization of the hardware accelerators overall, or prioritize utilization of some hardware accelerators that are better-optimized for performing operations in the computational graph of a processing pipeline.

For example, the scheduling engine of the distributed computing system corresponding to the hardware accelerators 210 and the computing devices 200 can be configured to detect the unavailability of one or more computing devices, and in response, re-assign computing devices across the hardware accelerators 210.

Figure 2C:
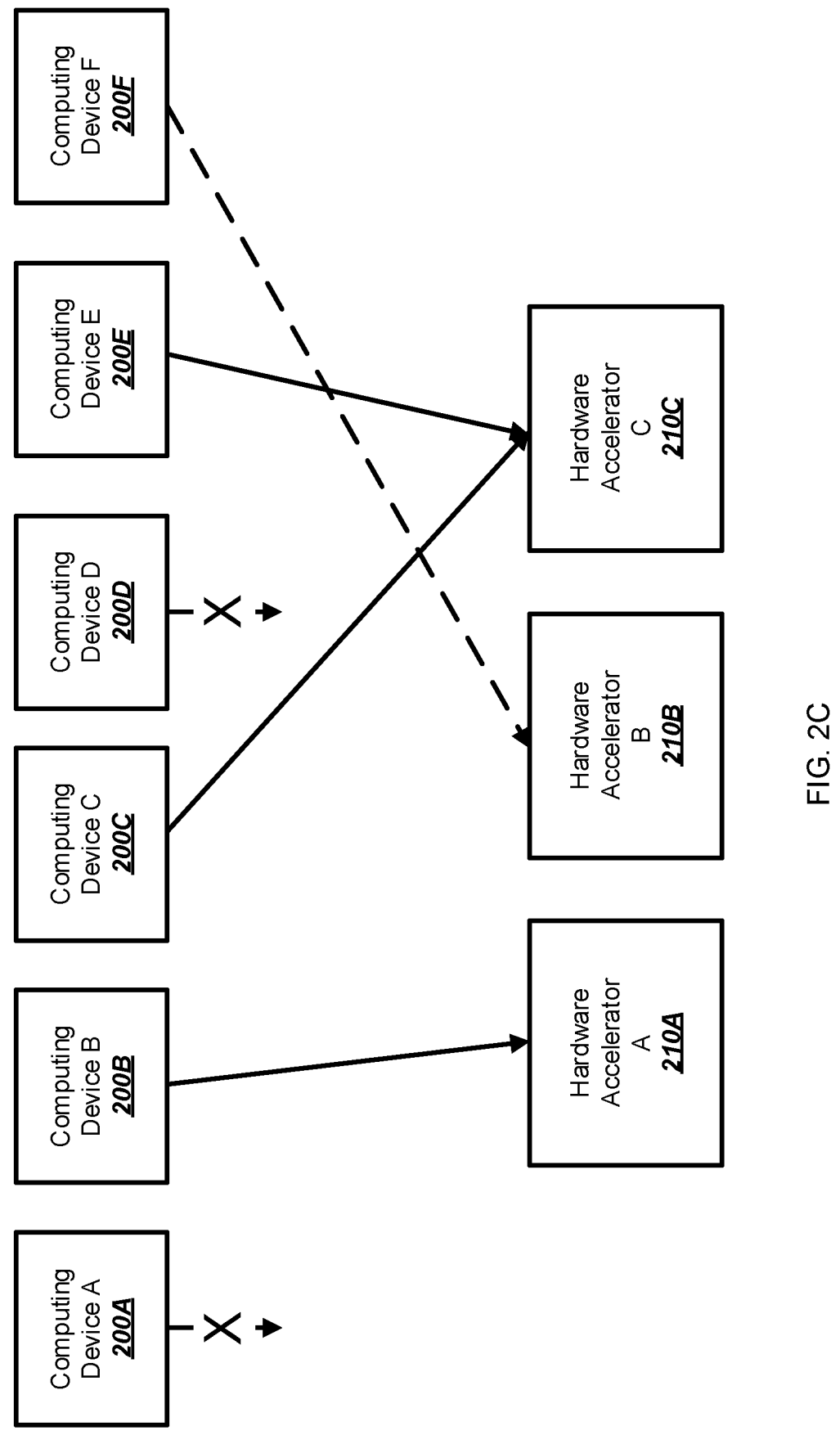
FIG. 2C illustrates the computing devices illustrated in FIG. 2B interconnected to the hardware accelerators and with unavailable computing devices.

FIG. 2C illustrates the computing devices 200 illustrated in FIG. 2B interconnected to the hardware accelerators 210 and with unavailable computing devices. In the example illustrated in FIG. 2C, the computing device A 200A and the computing device D 200D are unavailable, indicated by crossed-out arrows. The distributed computing system can determine that computing devices previously assigned to the hardware accelerator B 210B are unavailable, and in response re-assign the computing device F 200F from the hardware accelerator A 210A to the hardware accelerator B 210B.

The distributed computing system can make the decision of which of the computing devices 200 to assign to the hardware accelerator B 210B based on the relative overall utilization of the hardware accelerators 210. Continuing with the example started with the description of FIG. 2A, above, if the hardware accelerator A 210A has a relatively smaller computational capacity than the hardware accelerator C 210C, the distributed computing system can decide to reassign a computing device from the hardware accelerator A 210A, e.g., the computing device F 200F, to the hardware accelerator B 210B, instead of reassigning from a computing device assigned to the hardware accelerator C 210C.

As described above, the computing devices of the distributed computing system perform preprocessing operations which are stateless. As a result, the unavailability or availability of one computing device in general has no impact on another computing device's ability to generate data according to the preprocessing operations. In the example of preprocessed training examples for execution by hardware accelerators configured to train a neural network represented as a computational graph, each training example from each computing device can be generated from randomly sampled input data for an input dataset. For sufficiently large enough datasets, the probability two computing devices generate the same training example for the same assigned hardware accelerator is negligibly small.

Although description of the distributed computing system is made in this specification with reference to a single processing pipeline, e.g., the processing pipeline 105 of FIG. 1, the distributed computing system can be configured to receive and assign respective preprocessing operations and a respective computational graph for a plurality of different processing pipelines.

Referring back to FIG. 1, in implementations in which the distributed computing system 100 is configured to receive multiple processing pipelines, the scheduling engine 145 can be configured to schedule the plurality of processing pipelines based on available hardware accelerators and computing devices. For example, the scheduling engine 145 can prioritize assignment of different processing pipelines based on a variety of different metrics. The scheduling engine 145 can obtain the metrics from respective metadata of each processing pipeline, e.g., a priority level for a user or an estimated time to execute the processing pipeline for a set of input data.

The scheduling engine 145 can obtain additional metrics that are universally applicable to assigning each processing pipeline to the hardware accelerators 135 and the computing devices 140. For example, "global" metrics can include an energy-cost cap for maintaining a certain level of cost or energy output for operating the hardware accelerators and the computing devices, or a maximum allotted for performing a processing pipeline on particular computing devices and hardware accelerators before allowing another processing pipeline to be performed on those same computing devices and hardware accelerators.

Regardless of which metrics the scheduling engine 145 obtains, the scheduling engine 145 can be configured to prioritize different jobs according to the receive metrics, and schedule processing pipelines according to the prioritization. The scheduling engine 145 can maintain the pending processing pipelines in a queue, and/or notify a user through a respective client device that made the request for performing the processing pipeline that the request is pending until computational resources become available.

The processing pipeline can be configured to execute operations for accomplishing a machine learning task using reinforcement learning. For example, the preprocessing operations assigned to the computing devices can preprocess observational input that is processed by hardware accelerators assigned operation data representing a neural network configured to receive, as input, the observational input, and generate, as output, data defining an action to be performed by an agent observed in an environment, e.g., a probability distribution over possible actions. The neural network can be trained according to an objective function that measures rewards received by the agent in response to performing actions in the environment. The neural network can be trained according to the objective function to generate actions that result in the highest rewards for the agent.

Then, the hardware accelerators can be further configured to provide an output action to the computing devices assigned the preprocessing operations for the processing pipeline. The computing devices can also be further configured to cause the agent to execute the output action in the observed environment, and generate new observational data. The observational data can be preprocessed and transmitted to the hardware accelerators to complete the cycle.

The distributed computing system can be configured to repeat the cycle of observational input to action to new observational input until meeting some stopping condition, e.g., after a predetermined number of iterations or until a threshold reward is achieved by the agent.

FIG. 3 is a flowchart of an example process 300 for training a neural network. For convenience, the process 300 will be described as being performed by a system of one or more computers, located in one or more locations, and programmed appropriately in accordance with this specification. For example, a distributed computing system, e.g., the distributed computing system 100 of FIG. 1, appropriately programmed, can perform the process 300.

The distributed computing system receives 310 a request to execute a processing pipeline having first operations that transform raw inputs into preprocessed inputs, and second operations that operate on the preprocessed inputs. As described above with reference to FIG. 1, the distributed computing system can receive preprocessing operations and operation data representing operations for performing on the hardware accelerators. As part of the request, the distributed computing system can receive input data representing raw input to be preprocessed by computing devices assigned the preprocessing operations.

Next, in response to receiving the request, the distributed computing system performs the following:

The distributed computing system assigns 320 the first operations of the processing pipeline to two or more of a plurality of computing devices. The first operations, representing preprocessing operations to be received as input by the hardware accelerators assigned the operation data, is assigned to computing devices that are configured to execute the first operations and enqueue preprocessed inputs in a queue or other data structure.

The distributed computing system assigns 330 the second operations of the processing pipeline to one or more hardware accelerators of a plurality of hardware accelerators. The hardware accelerators assigned the second operations are configured to fetch preprocessed inputs from queues of computing devices assigned the first operations.

The distributed computing system executes 340, in parallel, the processing pipeline on the two or more computing devices and the one or more hardware accelerators. The distributed computing system can execute other processing pipelines while executing the processing pipeline having the first and second operations.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the implementations of the attached claims and the implementations described above, the following numbered implementations are also innovative:

Implementation 1 is a method comprising receiving a request to execute a processing pipeline, the processing pipeline comprising (i) first operations that transform raw inputs into pre-processed inputs and (ii) second operations that operate on the pre-processed inputs; and in response to receiving the request: assigning the first operations to two or more of a plurality of computing devices, wherein each of the plurality of computing devices is configured to execute assigned operations and maintain a queue of pre-processed inputs generated from repeatedly executing the first operations, assigning the second operations to one or more hardware accelerators of a plurality of hardware accelerators, wherein each hardware accelerator is interconnected with the plurality of computing devices over a network, and configured to (i) receive pre-processed inputs from respective queues of the two or more computing devices assigned the first operations and (ii) perform the second operations on the received pre-processed inputs, and executing, in parallel, the processing pipeline on the two or more computing devices and the one or more hardware accelerators.

Implementation 2 is the method of implementation 1, wherein the second operations comprise matrix operations performed during one or more neural network computations, and wherein the one or more hardware accelerators respectively comprise one or more neural network accelerators.

Implementation 3 is the method of any one of implementations 1 through 2, wherein each computing device comprises at least one central processing unit (CPU) based on a Von Neumann architecture.

Implementation 4 is the method of any one of implementations 1 through 3, wherein computing devices are assigned to hardware accelerators in respective ratios selected to limit or prevent starvation of each of the one or more hardware accelerators.

Implementation 5 is the method of implementation 4, wherein each ratio is dependent on a processing speed of a respective hardware accelerator of the one or more hardware accelerators and/or a processing speed of the computing devices.

Implementation 6 is the method of any one of implementations 1 through 5, wherein the operations further comprise: assigning, to each of the one or more hardware accelerators, one or more of the computing devices assigned the first operations; and wherein executing, in parallel, the processing pipeline on the two or more computing devices and the one or more hardware accelerators causes each of the one or more hardware accelerators to receive pre-processed inputs from respective computing devices assigned to the hardware accelerator.

Implementation 7 is the method of any one of implementations 1 through 6, wherein the wherein the plurality of hardware accelerators are heterogeneous and wherein assigning the two or more computing devices assigned the first operations comprises: for each hardware accelerator: determining a respective computational capacity for the hardware accelerator; and assigning at least one computing device assigned the first operations to the hardware accelerator based on the respective computational capacity for the hardware accelerator.

Implementation 8 is the method of any one of implementations 1 through 7, wherein executing, in parallel, the processing pipeline on the two or more computing devices and the one or more hardware accelerators causes each hardware accelerator to receive pre-processing inputs uniformly from each of the two or more computing devices.

Implementation 9 is the method of any one of implementations 1 through 8, wherein the plurality of computing devices is a plurality of first computing devices, wherein the network additionally interconnects a plurality of second computing devices to the plurality of hardware accelerators, and wherein the operations further comprise: receiving, from a second computing device of the plurality of second computing devices, an indication that the second computing device is available for transforming the raw inputs into the preprocessing inputs; and in response to the indication, assigning the second computing device the first operations.

Implementation 10 is the method of any of implementations 1 through 9, wherein a first hardware accelerator of the hardware accelerators assigned the second operations comprises a first central processing unit (CPU), and wherein the first hardware accelerator is further configured to: batch, by the host CPU, a plurality of preprocessing inputs from the respective queues of the two or more computing devices, and perform, by the first hardware accelerator, the second operations on the batch of preprocessing inputs.

Implementation 11 is the method of any one of implementations 1 through 10, wherein a first hardware accelerator of the hardware accelerators assigned the second operations comprises a first central processing unit (CPU), wherein each of the plurality of computing devices are further configured to compress each preprocessing input in a respective queue for the computing device using a compression algorithm, and wherein the first hardware accelerator is further configured to decompress, by the first CPU and using a decompression algorithm, each received compressed preprocessing input.

Implementation 12 is the method of any one of implementations 1 through 11, wherein the request is a first request, the processing pipeline is a first processing pipeline, and wherein the operations further comprise: receiving a second request to execute a second processing pipeline comprising third operations and a second computational graph; and in response to the request: assigning third operations that transform the raw inputs into the preprocessed inputs of the second processing pipeline to two or more of a plurality of computing devices not assigned the first operations, assigning a second computational graph to one or more hardware accelerators not assigned the first computational graph, and executing the second processing pipeline while executing the first processing pipeline.

Implementation 13 is the method of any one of implementations 1 through 12, wherein the first operations comprise machine learning preprocessing operations and wherein the preprocessed inputs are adapted for input into a machine learning model.

Implementation 14 is the method of implementation 13, wherein the raw inputs comprise training data and wherein the first operations comprise data augmentation operations to augment the training data.

Implementation 15 is the method of any one of implementations 1 through 14, wherein the one or more hardware accelerators respectively comprise one or more tensor processing units.

Implementation 16 is the method of any one of implementations 1 through 15, wherein the one or more computing devices comprise a plurality of load-balanced central processing units (CPUs).

Implementation 17 is the method of any one of implementations 1 through 16, wherein the processing pipeline is an image processing pipeline and wherein the raw inputs comprise image pixel data.

Implementation 18 is the method of any one of implementations 1 through 17, wherein the processing pipeline is an image classification pipeline.

Embodiment 19 is a system comprising one or more computers and one or more storage devices storing instructions that are operable, when executed by the one or more computers, to cause the one or more computers to perform the method of any one of implementations 1 through 18.

Implementation 20 is a computer storage medium encoded with a computer program, the program comprising instructions that are operable, when executed by data processing apparatus, to cause the data processing apparatus to perform the method of any one of implementations 1 through 18.

While this specification contains many specific implementation details, these should not be construed as limitations on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving a request to execute a processing pipeline, the processing pipeline comprising (i) first operations that transform raw inputs into pre-processed inputs and (ii) second operations that operate on the pre-processed inputs; and
in response to receiving the request:
assigning the first operations to two or more of a plurality of computing devices, wherein each of the plurality of computing devices is configured to execute assigned operations and maintain a queue of pre-processed inputs generated from repeatedly executing the first operations,
assigning the second operations to one or more hardware accelerators of a plurality of hardware accelerators, wherein each of the one or more hardware accelerators is assigned to interconnect with a respective number of computing devices of the plurality of computing devices over a network, and configured to (i) receive pre-processed inputs from respective queues of the two or more computing devices assigned the first operations and (ii) perform the second operations on the received pre-processed inputs, wherein assigning each of the one or more hardware accelerators to interconnect with the respective number of computing devices comprises:
identifying, for each of the one or more hardware accelerators, a ratio that represents assigning the respective number of computing devices to the hardware accelerator such that the respective number of computing devices are configured to provide pre-processed inputs to the hardware accelerator to limit or prevent starvation of the hardware accelerator; and
automatically assigning, for each of the one or more hardware accelerators, the respective number of computing devices to the hardware accelerator using the identified ratio for the hardware accelerator, and
executing the first operations of the processing pipeline on the two or more computing devices and the second operations of the processing pipeline on the one or more hardware accelerators.

2. The computer-implemented method of claim 1, wherein the second operations comprise matrix operations performed during one or more neural network computations, and wherein the one or more hardware accelerators respectively comprise one or more neural network accelerators.

3. The computer-implemented method of claim 1, wherein each computing device comprises at least one central processing unit (CPU) based on a Von Neumann architecture.

4. The computer-implemented method of claim 1, wherein each of the ratios is dependent on a processing speed of a respective hardware accelerator of the one or more hardware accelerators or a processing speed of a respective computing device of the plurality of computing devices.

5. The computer-implemented method of claim 1, comprising:
assigning, to each of the one or more hardware accelerators, one or more of the plurality of computing devices assigned with the first operations; and
wherein executing the first operations of the processing pipeline on the two or more computing devices and the second operations of the processing pipeline on the one or more hardware accelerators causes each of the one or more hardware accelerators to receive pre-processed inputs from respective computing devices assigned to the hardware accelerator.

6. The computer-implemented method of claim 1, wherein the plurality of hardware accelerators is heterogeneous and wherein assigning the two or more computing devices assigned with the first operations comprises:
for each of the one or more hardware accelerators:
determining a respective computational capacity for the hardware accelerator; and
assigning at least one computing device assigned with the first operations to the hardware accelerator based on the respective computational capacity for the hardware accelerator.

7. The computer-implemented method of claim 1, wherein executing, the first operations of the processing pipeline on the two or more computing devices and the second operations of the processing pipeline on the one or more hardware accelerators causes each of the one or more hardware accelerators to receive pre-processed inputs uniformly from each of the two or more computing devices.

8. The computer-implemented method of claim 1, wherein the plurality of computing devices is a plurality of first computing devices, wherein the network additionally interconnects a plurality of second computing devices to the plurality of hardware accelerators, and wherein the computer-implemented method further comprises:
receiving, from a second computing device of the plurality of second computing devices, an indication that the second computing device is available for transforming the raw inputs into the pre-processed inputs; and
in response to the indication, assigning the second computing device with the first operations.

9. The computer-implemented method of claim 1, wherein a first hardware accelerator of the hardware accelerators assigned with the second operations comprises a first central processing unit (CPU), and
wherein the first hardware accelerator is further configured to:
batch, by the first CPU, a plurality of pre-processed inputs from the respective queues of the two or more computing devices, and
perform, by the first hardware accelerator, the second operations on the batch of pre-processed inputs.

10. The computer-implemented method of claim 1, wherein a first hardware accelerator of the one or more hardware accelerators assigned with the second operations comprises a first central processing unit (CPU), wherein each of the plurality of computing devices is further configured to compress each pre-processed input in a respective queue for the computing device using a compression algorithm, and wherein the first hardware accelerator is further configured to decompress, by the first CPU and using a decompression algorithm, each received compressed pre-processed input.

11. The computer-implemented method of claim 1, wherein the request is a first request, the processing pipeline is a first processing pipeline, and wherein the computer-implemented method further comprises:

receiving a second request to execute a second processing pipeline comprising third operations and a second computational graph; and in response to the second request:

assigning third operations that transform the raw inputs into the pre-processed inputs of the second processing pipeline to two or more of a plurality of computing devices not assigned with the first operations, assigning the second computational graph to one or more hardware accelerators not assigned with the second operations, and executing the second processing pipeline while executing the first processing pipeline.

12. The computer-implemented method of claim 1, wherein the first operations comprise machine learning pre-processing operations and wherein the pre-processed inputs are adapted for input into a machine learning model.

13. The computer-implemented method of claim 12, wherein the raw inputs comprise training data and wherein the first operations comprise data augmentation operations to augment the training data.

14. The computer-implemented method of claim 1, wherein the one or more hardware accelerators respectively comprise one or more tensor processing units.

15. The computer-implemented method of claim 1, wherein the one or more computing devices comprise a plurality of load-balanced central processing units (CPUs).

16. The computer-implemented method of claim 1, wherein the processing pipeline is an image processing pipeline and wherein the raw inputs comprise image pixel data.

17. The computer-implemented method of claim 1, wherein the processing pipeline is an image classification pipeline.

18. A system comprising one or more computers and one or more storage devices on which are stored instructions that are operable, when executed by the one or more computers, to cause the one or more computers to perform operations comprising:

receiving a request to execute a processing pipeline, the processing pipeline comprising (i) first operations that transform raw inputs into pre-processed inputs and (ii) second operations that operate on the pre-processed inputs; and in response to receiving the request:

assigning the first operations to two or more of a plurality of computing devices, wherein each of the plurality of computing devices is configured to execute assigned operations and maintain a queue of pre-processed inputs generated from repeatedly executing the first operations, assigning the second operations to one or more hardware accelerators of a plurality of hardware accelerators, wherein each of the one or more hardware accelerators is assigned to interconnect with a respective number of computing devices of the plurality of computing devices over a network, and configured to (i) receive pre-processed inputs from respective queues of the two or more computing devices assigned the first operations and (ii) perform the second operations on the received pre-processed inputs, wherein assigning each of the one or more hardware accelerators to interconnect with the respective number of computing devices comprises:

identifying, for each of the one or more hardware accelerators, a ratio that represents assigning the respective number of computing devices to the hardware accelerator such that the respective number of computing devices are configured to provide pre-processed inputs to the hardware accelerator so as to limit or prevent starvation of the hardware accelerator; and automatically assigning, for each of the one or more hardware accelerators, the respective number of computing devices to the hardware accelerator using the identified ratio, and executing the first operations of the processing pipeline on the two or more computing devices and the second operations of the processing pipeline on the one or more hardware accelerators.

19. One or more non-transitory computer storage media encoded with instructions that, when executed by one or more computers, cause the one or more computers to perform operations comprising:

receiving a request to execute a processing pipeline, the processing pipeline comprising (i) first operations that transform raw inputs into pre-processed inputs and (ii) second operations that operate on the pre-processed inputs; and in response to receiving the request:

assigning the first operations to two or more of a plurality of computing devices, wherein each of the plurality of computing devices is configured to execute assigned operations and maintain a queue of pre-processed inputs generated from repeatedly executing the first operations, assigning the second operations to one or more hardware accelerators of a plurality of hardware accelerators, wherein each of the one or more hardware accelerators is assigned to interconnect with a respective number of computing devices of the plurality of computing devices over a network, and configured to (i) receive pre-processed inputs from respective queues of the two or more computing devices assigned the first operations and (ii) perform the second operations on the received pre-processed inputs, wherein assigning each of the one or more hardware accelerators to interconnect with the respective number of computing devices comprises:

identifying, for each of the one or more hardware accelerators, a ratio that represents assigning the respective number of computing devices to the hardware accelerator such that the respective number of computing devices are configured to provide pre-processed inputs to the hardware accelerator so as to limit or prevent starvation of the hardware accelerator; and automatically assigning, for each of the one or more hardware accelerators, the respective number of computing devices to the hardware accelerator using the identified ratio, and executing the first operations of the processing pipeline on the two or more computing devices and the second operations of the processing pipeline on the one or more hardware accelerators.

* * * * *